2,892,799
ALUMINA AGGREGATES OF IMPROVED CRUSHING STRENGTH

Harry M. Brennan, Hammond, Ind., Herman S. Seelig, Forest Park, Ill., and Roy W. Vander Haar, Highland, Ind., assignors to Standard Oil Company, Chicago, Ill., a corporation of Indiana No Drawing. Application April 19, 1957
Serial No. 653,734

6 Claims. (Cl. 252—442)

Our invention relates to aggregates of alumina. More particularly it relates to an improved type of particular alumina, having superior mechanical strength.

One of the important requirements in the production of pelleted catalysts for use in fixed-bed catalytic operations is that the catalyst support be of sufficient strength to support its own weight and to withstand the attritional effects of vibration, process-stream turbulence, transient bed-lifting, and similar disturbances ordinarily encountered in fixed-bed processes. Failure to satisfy these requirements is a frequent source of difficulty with various types of catalysts, and gradual loss of mechanical strength during use is a common occurrence, for example in the case of molybdena-alumina hydroforming catalysts, necessitating the discard of catalyst which in other respects would continue to be entirely satisfactory. It is an object of our invention to produce an alumina aggregate of improved mechanical strength and stability, especially adapted for use as a catalyst, per se, or for use as a supporting material for other types of catalytic substances.

We have discovered that calcined alumina aggregates can be greatly improved in crushing strength by impregnation thereof with an aqueous solution of aluminum nitrate or aluminum halide, and thereafter drying and calcining. We have also found that a further substantial increase in crushing strength can be produced by washing the said impregnated alumina, either before or after being dried and/or calcined, with an aqueous ammonia solution, and thereafter drying and calcining.

The aluminum halide or nitrate is employed in aqueous solution, which may additionally contain an organic solvent such as acetone, methanol, ethanol, isopropyl alcohol, or the like, or other class of wetting agent or wetting assistant of the types described in the art, such as sodium benzenesulfonate, a polyethylene glycol, a glycol ether, or the like. Such solvents or other additives may be employed in substantially any concentration up to the saturation point or point of incompatability. The concentration of aluminum halide or nitrate in the impregnating solution may suitably range from about 0.01 M up to the saturation point, a concentration between about 0.1 M and 2 M being a convenient level in most cases. In a preferred embodiment, we treat the alumina with just enough solution to wet and saturate the aggregates; such an impregnation technique facilitates the regulation of the quantity of aluminum halide or nitrate incorporated in the alumina. For this purpose, between about 75 and 80 grams of solution per 100 grams of pellets are ordinarily sufficient. It will be apparent, of course, that a conventional impregnation by soaking the alumina in an excess of solution may also be employed. The quantity and concentration of solution absorbed by the alumina should be sufficient to incorporate at least about 0.1 percent by weight of aluminum halide or nitrate therein based on dry $Al_2O_3$ in the alumina. Considerably higher proportions of salt may also be added, e.g. up to around 40 percent by weight, but our preferred range is between about 1 and 20 percent by weight. If platinum is present, mixtures of aluminum nitrate and aluminum chloride should not be used; otherwise, platinum stripping may result. A mixture of the halides, however, may be used. The treatment can be carried out at substantially any temperature, so long as the treating solution is maintained in the liquid phase without deleterious decomposition of the materials dissolved therein. We prefer, however, to employ ordinary pressures and ordinary temperatures within the range of about 50 to 200° F. The wetted aggregates may then optionally be dried at a temperature between about 200 and 300° F., a drying time of about 1 to 24 hours being ordinarily sufficient, and thereafter calcined at a temperature between about 800 and 1200° F., preferably around 1100° F., for about 1 to 12 hours.

After treating with aluminum halide or nitrate, the treated alumina pellets, either before or after being dried and/or calcined, preferably before, are washed, steeped, soaked, or elutriated with an ammonia solution under ordinary conditions of temperature and pressure, preferably elevated temperature, e.g. 200° F., and are thereafter dried and calcined as previously set forth. For this purpose, aqueous ammonium hydroxide is employed, or an aqueous ammonium salt such as the carbonate, bicarbonate, phosphate, or the like, which affords ammonium hydroxide under the treating conditions. Wash solutions containing from about 1 to 30 percent $NH_3$ by weight are conveniently employed. From one to five volumes of solution per volume of pellets are ordinarily sufficient. The treated pellets, after calcination, exhibit a striking increase in crushing strength.

Our new technique is applicable to the treatment of calcined pellets of hydrous alumina, the said alumina being of the xerogel type, prepared by drying alumina gels or sols, specifically alumina hydrogels, hydrosols, ultragels, or the like. For example, alumina hydrogel is precipitated from an aluminum salt solution by addition of alkali, and is thereafter washed to remove impurities therefrom, and dried. As another example, a Heard-type alumina hydrosol, prepared as described in Reissue Patent 22,196 (October 6, 1942), is gelled and dried. As another example, an aluminum alkoxide is hydrolyzed and the resulting alumina gel is separated and dried. As a further alternative, an alumina hydrosol or other form of peptized alumina is aged at a pH in the range of 8.5 to 12 for a period in excess of one hour to form a precipitate of solid, hydrous alumina, which is then dried. Various other alternative techniques will be apparent to those skilled in the art. In all cases, the product alumina is a solid, porous material which retains a small proportion of water within the gel lattice and exhibits considerable surface activity. Before the alumina is treated according to our new process, it is pelleted and calcined, first being further dried by ignition at a high temperature between about 800 and 1200° F., preferably around 900° F., for about 1 to 12 hours, then crushed to a powder, and lubricated with stearic acid, rosin, Sterotex (a hydrogenated coconut oil), graphite, or the like. The resulting gamma-type alumina, usually in the chi, gamma, or eta phases (ALCOA Technical Paper No. 10, Allan S. Russell, copyright 1953, at page 16), is thereafter formed into pills, pellets, spheres, saddles, rings, rosettes, irregular masses, or other shapes in which it is ultimately desired to be used. The resulting particulate solid is dried at a temperature between about 200 and 300° F. for 1 to 24 hours, and is finally calcined at a temperature between about 800 and 1200° F., preferably around 1100° F. in air, for about 1 to 12 hours.

Alumina spheres suitable for treatment according to our process may alternatively be prepared by gelling droplets of alumina hydrosol in an organic liquid, aging in aqueous alkali, water-washing, drying, and calcining under the conditions defined above.

Our invention will be more fully understood from the following specific examples.

Example 1

The following series of tests demonstrate the effectiveness of our invention in the treatment of calcined pellets of hydrous alumina, in contrast with other forms of alumina. In all of the tests, the original source of alumina was a Heard-type alumina powder, produced by drying a Heard-type alumina gel, calcining in air for 3 hours at 900° F., and pulverizing.

A quantity of the Heard-type alumina powder was saturated with 1 M aluminum chloride, dried overnight at 220° F., calcined in air for 3 hours at 900° F. and lubricated with 4 percent Sterotex. This material, when pilled at the optimum setting of the pilling machine, gave very fragile pills having a crushing strength of only 1.5 pounds. A portion of the resulting pills were calcined in air at 1100° F. in an effort to improve their mechanical properties, but the calcined pills were still of poor quality and had a pronounced tendency to cap. The crushing strength of unbroken pills from the calcined portion was less than one pound.

Another portion of the original Heard-type alumina powder was lubricated and pilled without a prior treatment with aluminum chloride solution. At the same setting of the pilling machine previously employed, raw, uncalcined pills were obtained having a crushing strength of 16 pounds. A portion of these uncalcined pills with the lubricant still in them was saturated with aqueous 1 M aluminum chloride solution and dried overnight at 220° F. The treated pills were found to be very weak, having a crushing strength of less than one pound. They were then calcined in air for 6 hours at 1100° F. This treatment raised their crushing strength to 8.7 pounds, but they were still of poor quality, and showed a tendency to cap.

Another portion of the original Heard-type alumina powder was lubricated, pilled, and calcined in air for 6 hours at 1100° F. The pills had a crushing strength of 22.4 pounds. A portion of these pills were saturated with aqueous 1 M aluminum chloride, dried overnight at 220° F., calcined in air for 6 hours at 1100° F., and found to have a crushing strength of 32.4 pounds. A much greater improvement is obtainable by treating the pellets with aqueous ammonia solution either before or after being dried and/or calcined and thereafter drying and calcining.

In all of the foregoing tests, a single setting of the pilling machine was used to permit ready comparison of the results. This setting, however, was optimum only for the first test, and in subsequent tests, the results were less than optimum because of excessive pill density, excessive die wear, or tendency of the pills to cap. The tests nevertheless demonstrate that our new process is highly effective in the treatment of calcined pellets of hydrous alumina to produce a large increase in the crushing strength thereof.

Example 2

A Heard-type alumina gel was dried, calcined, crushed to a powder, lubricated with 4 percent of Sterotex, and formed into 1/8" x 1/8" cylindrical pills, which were calcined in air for 6 hours at 1100° F. The calcined pills were found to have an axial crushing strength of 6.9 pounds.

A quantity of the calcined alumina pills, prepared as described above, were saturated with a 1 M aqueous solution of aluminum chloride, dried overnight at 220° F., and calcined in air for 3 hours at 1100° F. The treated pills were found to have a crushing strength of 11.8 pounds.

Another quantity of the calcined alumina pills, prepared as described above, were saturated with a 1 M aqueous solution of aluminum chloride, washed with aqueous 10 percent $NH_3$ solution, dried overnight at 220° F., and calcined in air for 3 hours at 1100° F. The treated pills were found to have a crushing strength of 24.1 pounds.

Still another quantity of the calcined alumina pills, prepared as described above, were saturated with a 1 M aqueous solution of aluminum chloride, dried overnight at 220° F., washed with aqueous 10 percent $NH_3$ solution, dried for 5 hours at 220° F., and calcined in air for 3 hours at 1100° F. The treated pills were found to have a crushing strength of 23.4 pounds.

Example 3

A Heard-type alumina hydrosol, after addition of chloroplatinic acid and ammonium sulfide, was gelled by addition of ammonium hydroxide, dried at about 300° F. for about 16 hours, calcined at about 950° F. for about three hours, crushed to a powder, lubricated with Sterotex, pilled, and calcined at about 1100° F. for about four hours. The resulting gamma-alumina pills, containing about 0.6 weight percent platinum, were found to have an axial crushing strength of 12.2 pounds.

A quantity of the calcined alumina pills, prepared as described above, were saturated with a 1 M aqueous solution of aluminum nitrate for a period of about one hour, washed with aqueous 29 percent $NH_3$ solution, dried at about 300° F. for about 16 hours, and thereafter calcined at about 1100° F. for about three hours. The treated pills were found to have a crushing strength of 31.6 pounds.

Another quantity of the same calcined alumina pills were saturated with a 1 M aqueous solution of aluminum nitrate for a period of about one hour, in the same manner as above, but were then washed with water, rather than with $NH_3$ solution, and thereafter dried and calcined as above. The treated pills were found to have a crushing strength of 12.0 pounds. This illustrates the complete failure of the water wash, as contrasted with the $NH_3$ wash, in the practice of our invention.

Example 4

A Heard-type alumina hydrosol was aged at a pH of about 10 for a period of about four days. The resulting solid, hydrous alumina was dried at about 200–300° F. for about 16 hours, impregnated with chloroplatinic acid and ammonium sulfide, again dried at about 200–300° F. for about 16 hours, crushed to a powder, lubricated with Sterotex, pilled, and calcined at about 1000–1100° F. for about 6 hours. The resulting eta-alumina pills, containing about 0.6 weight percent platinum, were found to have a crushing strength of about 12.7 pounds.

A quantity of the calcined alumina pills, prepared as described above, were saturated with a 1 M aqueous solution of aluminum chloride for about two hours, soaked with aqueous 29 percent ammonia solution for about one hour, dried at about 225° F. for about 16 hours, and thereafter calcined at about 1000° F. for about two hours. The treated pills were found to have a crushing strength of 17.7 pounds.

Another quantity of the same calcined alumina pills were treated in exactly the same manner as above, except that 1 M aqueous solution of aluminum nitrate, instead of aluminum chloride, was used. The treated pills were found to have a crushing strength of 21.3 pounds.

The treated alumina obtained from our process is suitable per se as a catlyst for various processes, such as the dehydration of alcohols, the reaction of methanol and ammonia to produce methylamines, the vapor-phase finishing of synthetic gasolines, and the like. The alumina is also a highly satisfactory support for various other catalytic materials, such as molybdena, chromia, platinum, nickel, and the like. The addition of such other substances to our treated alumina is conveniently carried out according to the techniques described in the art.

While we have described our invention with reference to certain specific embodiments thereof, it is to be understood that such embodiments are illustrative only and not by way of limitation. Various modifications of our invention and alternative operating procedures and conditions will be apparent from the foregoing description to those skilled in the art.

This application is a continuation-in-part of our application Serial Number 379,458, filed September 10, 1953, now abandoned.

In accordance with the foregoing description, we claim as our invention:

1. A method for preparing alumina in a form having improved physical properties which comprises calcining pellets of hydrous alumina at a temperature between about 800 and 1200° F., impregnating the calcined pellets with an aqueous solution of an alumina salt selected from the class consisting of alumina nitrate and aluminum chloride, said aluminum salt having a concentration between about 0.1 and 2 molar, soaking the impregnated pellets with aqueous ammonium hydroxide, drying the soaked pellets at a temperature between about 200 and 300° F., and calcining the dried pellets at a temperature between about 800 and 1200° F.

2. A method for preparing alumina in a form having improved physical properties which comprises calcining pellets of hydrous alumina at a temperature between about 800 and 1200° F., impregnating the calcined pellets with an aqueous solution of aluminum chloride having a concentration between about 0.1 and 2 molar, soaking the impregnated pellets with aqueous ammonium hydroxide, drying the soaked pellets at a temperature between about 200 and 300° F., and calcining the dried pellets at a temperature between about 800 and 1200° F.

3. A method for preparing alumina of increased crushing strength which comprises calcining pellets of hydrous alumina at a temperature between about 800 and 1200° F., saturating the calcined pellets with an aqueous solution of an aluminum salt selected from the class consisting of aluminum nitrate and aluminum chloride, said aluminum salt having a concentration between about 0.1 and 2 molar, drying the saturated pellets, washing the dried pellets with aqueous ammonium hydroxide, drying the washed pellets, and calcining the dried pellets at a temperature between about 800 and 1200° F.

4. A method for preparing alumina of increased crushing strength which comprises calcining pellets of hydrous alumina at a temperature between about 800 and 1200° F., saturating the calcined pellets with an aqueous solution of aluminum nitrate having a concentration between about 0.1 and 2 molar, drying the saturated pellets, washing the dried pellets with aqueous ammonium hydroxide, drying the washed pellets, and calcining the dried pellets at a temperature between about 800 and 1200° F.

5. A method for preparing alumina of increased crushing strength which comprises calcining pellets of hydrous alumina at a temperature between about 800 and 1200° F., saturating the calcined pellets with an aqueous solution of aluminum chloride having a concentration between about 0.1 and 2 molar, drying the saturated pellets, washing the dried pellets with aqueous 10 percent ammonia, drying the washed pellets at a temperature between about 200 and 300° F., and calcining the dried pellets at a temperature between about 800 and 1200° F.

6. The method of claim 1 wherein the soaking of the impregnated pellets with aqueous ammonia hydroxide is effected at an elevated temperature with 1 to 5 volumes of a solution of 1 to 30 weight percent ammonia per volume of pellets.

References Cited in the file of this patent
UNITED STATES PATENTS

| | | |
|---|---|---|
| 2,415,061 | De Simo et al. | Jan. 28, 1947 |
| 2,493,499 | Perry | Jan. 3, 1950 |
| 2,601,624 | Owen et al. | Jan. 24, 1952 |
| 2,662,860 | Engel et al. | Dec. 15, 1953 |
| 2,672,452 | Waukat | Mar. 16, 1954 |

UNITED STATES PATENT OFFICE
CERTIFICATE OF CORRECTION

Patent No. 2,892,799

June 30, 1959

Harry M. Brennan et al.

It is hereby certified that error appears in the printed specification of the above numbered patent requiring correction and that the said Letters Patent should read as corrected below.

Column 1, line 16, for "particular" read -- particulate --; column 4, line 22, for "ponnds" read -- pounds --; line 66, for "catlyst" read -- catalyst --; column 5, lines 16 and 17, for "alumina", each occurrence, read -- aluminum --.

Signed and sealed this 19th day of April 1960.

(SEAL)
Attest:

KARL H. AXLINE
Attesting Officer

ROBERT C. WATSON
Commissioner of Patents